R. V. BUCHANAN.
LAMP BURNER.
APPLICATION FILED JULY 27, 1909.
946,331.
Patented Jan. 11, 1910.
2 SHEETS—SHEET 1.
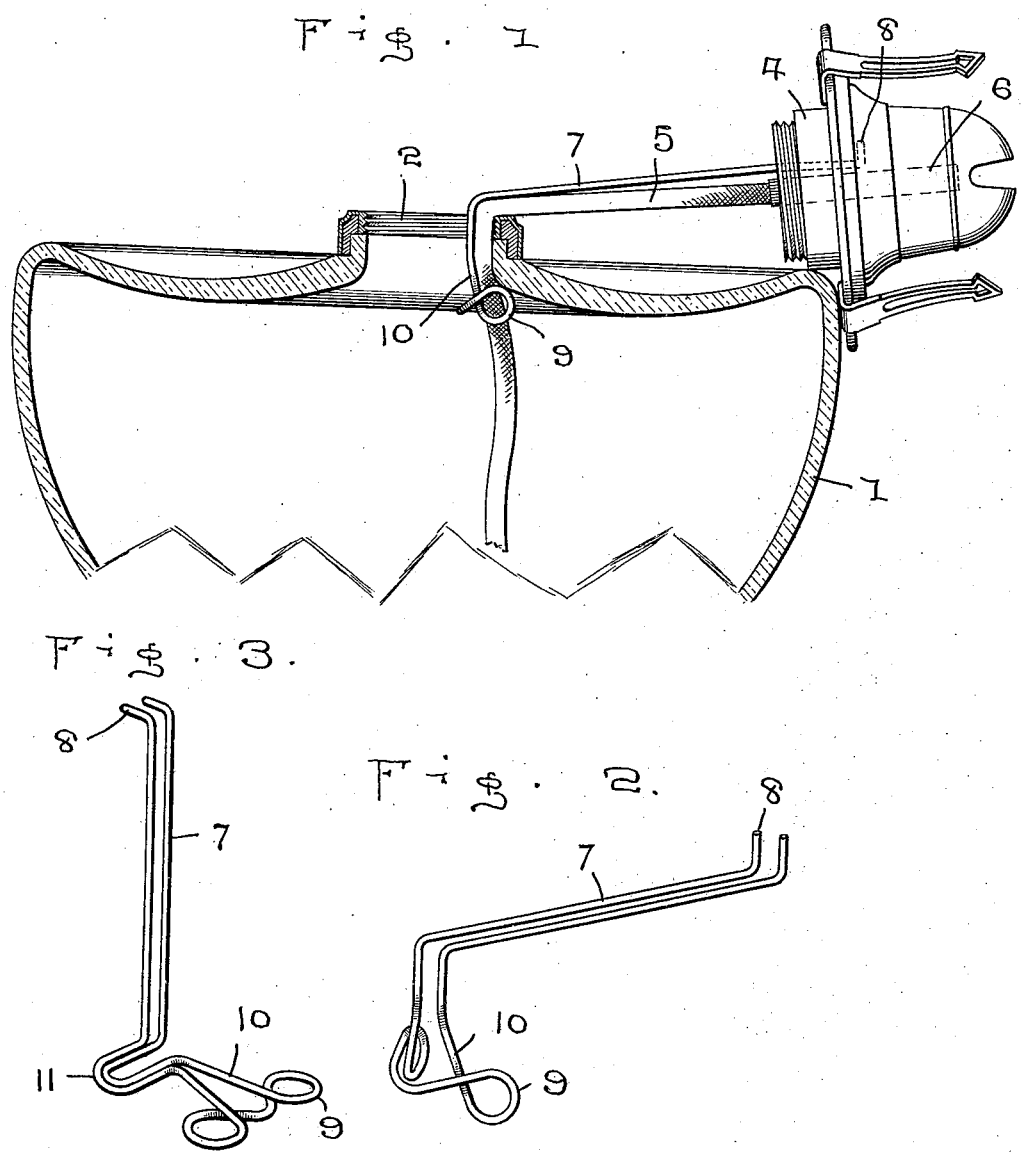
WITNESSES:
INVENTOR
R. V. Buchanan
BY
W. J. FitzGerald & Co.
Attorneys R. V. BUCHANAN.
LAMP BURNER.
APPLICATION FILED JULY 27, 1909.
946,331.
Patented Jan. 11, 1910.
2 SHEETS—SHEET 2.
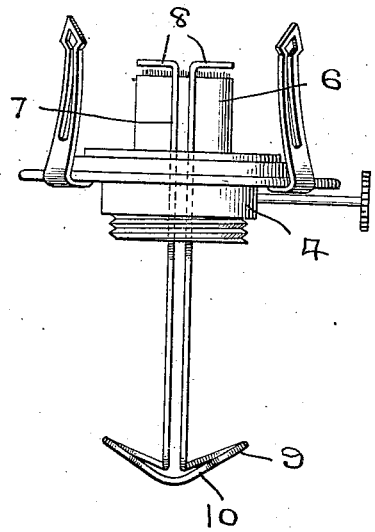
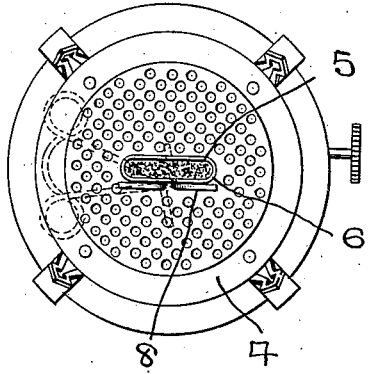
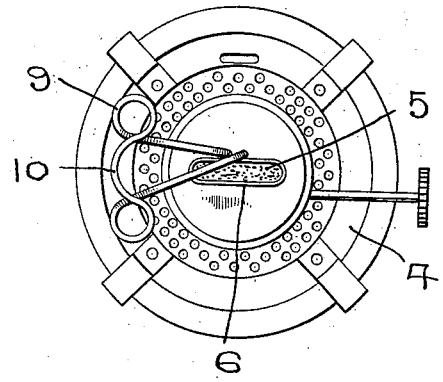
WITNESSES:
INVENTOR
R. V. Buchanan
BY
W. J. Fitzgerald & Co.
Attorneys

UNITED STATES PATENT OFFICE.

RIP V. BUCHANAN, OF PRINCETON, ILLINOIS.

LAMP-BURNER.

946,331.	Specification of Letters Patent.	Patented Jan. 11, 1910.

Application filed July 27, 1909. Serial No. 509,791.

*To all whom it may concern:*

Be it known that I, RIP V. BUCHANAN, a citizen of the United States, residing at Princeton, in the county of Bureau and State of Illinois, have invented certain new and useful Improvements in Lamp-Burners; and I do hereby declare the following to be a full, clear, and exact description of the invention, such as will enable others skilled in the art to which it appertains to make and use the same.

My invention relates to new and useful improvements in attachments for lamp burners and my object is to provide means for holding the wick to one side of the opening in the bowl of the lamp, while the bowl is being filled.

A further object is to provide means for retaining the wick in a vertical position when the burner is properly adjusted on the lamp bowl.

A further object is to provide means for suspending the burner on the lamp bowl while the lamp is being filled, and a further object is to so arrange the attachment that the same may be used for removing the charred portion of the wick.

Other objects and advantages will be hereinafter referred to and more particularly pointed out in the claims.

In the accompanying drawings forming part of this application, Figure 1 is a fragmentary section of a lamp bowl, showing a burner thereon and my improved attachment applied to the burner also showing the manner of suspending the burner and wick when the bowl is being filled. Fig. 2 is a perspective view of my improved attachment removed from the burner. Fig. 3 is a similar view of a slightly modified form of attachment. Fig. 4 is a detail elevation of a burner showing the arrangement of that form of device used for removing the charred portion of the wick. Fig. 5 is a top plan view thereof, showing the positions of the attachment in full and dotted lines, and, Fig. 6 is a bottom plan view of the burner, showing the position of the lower end of the attachment when used to clean the wick or dispose the same in position to permit the wick to be entered into the burner.

Referring to the drawings in which similar reference numerals designate corresponding parts throughout the several views, 1 indicates the bowl of the lamp which may be constructed in the usual or any preferred manner and 2 indicates the collar at the upper end of the lamp, which collar is interiorly threaded to receive the threaded portion of the burner 4, said burner being constructed in the usual or any preferred manner and having a wick 5 extending through the tube 6 of the burner.

In order to obviate the necessity of lifting the burner and wick entirely free of the lamp in order to fill the bowl, I provide my improved attachment, which comprises a pair of parallel bars 7, said bars being introduced through the burner and extend along one face of the tube 6, the upper ends of said bars being bent at right angles to form handles 8, so that said handles may be readily grasped and the rods moved longitudinally to properly adjust the same.

The lower ends of the bars terminate in a laterally extending fan-like bracket 10, the free end of said bracket being bent in such shape as to form retaining members 9, which extend beyond the plane of the bracket and engage the edges of the wick and thereby hold the wick in alinement with the bracket.

When it is desired to fill the lamp, the burner is released from the collar 2 and extended at right angles to its normal position, the burner resting on the bowl and adjacent the outer edge thereof, while the bracket 10 engages the collar 2 and holds the burner in position, the loops 9 of the bracket 10 extending inwardly and below the mouth of the bowl to which the collar is attached. By means of the bracket 10, the burner will be securely held in this position while the bowl is being filled and likewise the wick will be held at one side of the opening through the collar until such time as the burner is replaced on the lamp. In this manner, it will be readily seen that the filling of the lamp with oil will be greatly simplified and the objectionable feature of providing something in which to place the wick when removed from the bowl, obviated, thus rendering the work more cleanly and the operation of filling the lamp can be more expeditiously accomplished.

In Fig. 3 of the drawings I have shown a slightly modified form of device, in that the bars 7 are provided at a point adjacent their juncture with the bracket 10 with a laterally extending recess 11, which is formed by bringing the paralleling bars 7 together at this point and bending the same outwardly at right angles to the trend of the bars and in practice the wick is engaged with the recess 11 and remains in a vertical position when the burner is attached to the lamp.

As shown in Figs. 4, 5 and 6 of the drawings, the handles are extended parallel with the face of the tube 6 so that when the handles are raised to the upper end of the tube and the bracket 10 swung to the position shown by dotted lines in Fig. 5 and by full lines in Fig. 6, one of the handles will be swung across the path of the wick as shown by dotted lines in Fig. 5, thereby removing a portion of the charred or burned parts of the wick, while by turning the bracket in the opposite direction, the opposite handle will be swung into engagement with the wick and remove the remaining portion of the burned or charred parts of the wick, and as the two handles are in the same relative plane, the wick will be trimmed perfectly true across its upper end and the removal of the charred portion may be readily accomplished without soiling the hands. It will likewise be seen that by turning the bracket to the position shown in Fig. 6, the wick may be readily introduced into the tube without conflicting with the bracket.

Should the burner be attached to a lamp with a glowing bowl instead of a flat top bowl as shown, the burner may be moved inwardly on the bars 7 until the burner will engage the bowl and rest thereon when the bracket is secured to the lamp as shown.

The attachment is preferably constructed from a single section of wire which is first folded upon itself at its longitudinal center, its closed end being then bent to form the bracket 10 and loops 9, the remaining portion of the wires forming the parallel bars 7.

After the attachment is so formed, the upper ends of the bars 7 are introduced through the burner as shown and the extreme upper ends thereof then bent at right angles to form the handles 8.

By constructing the attachment from a single piece of wire, it will be readily seen that it can be very cheaply constructed and quickly applied to use and with care in handling the same, will be practically indestructible.

What I claim is:

1. A device of the character described, comprising parallel bar-members terminating at their upper ends in lateral handle extensions adapted to occupy a plane laterally of a wick tube for engagement with the charred portion of the wick, the lower ends of said parallel bars also terminating in lateral extensions formed with eye-shaped portions in continuation of said extensions.

2. A device of the character described, comprising parallel bars terminating at their upper ends in lateral handle members adapted to occupy a plane laterally of a wick-tube, for engagement with the charred portion of the wick, the lower ends of said bars being extended laterally and upwardly and outwardly in an inclined position, the extensions thus formed being provided with eye-shaped formations in continuation of said extensions.

3. A device of the character described, consisting of a single piece having parallel bar-members terminating at their upper ends in lateral handle members arranged in a plane laterally of a wick burner and for engagement with the charred portion of a wick, said bar-members terminating at their transverse lateral extensions diverging outwardly from each other and having eye shaped formations produced in continuation of said extensions, said extensions, together with said eye shaped formations, being deflected oppositely from each other in an upward and outward direction.

In testimony whereof I have signed my name to this specification in the presence of two subscribing witnesses.

RIP V. BUCHANAN.

Witnesses:
PEARL LAFFERTY,
W. C. SEIPLE.

It is hereby certified that in Letters Patent No. 946,331, granted January 11, 1910, upon the application of Rip V. Buchanan, of Princeton, Illinois, for an improvement in "Lamp-Burners," an error appears in the printed specification requiring correction as follows: Page 2, line 32, the word "glowing" should read *globular;* and that the said Letters Patent should be read with this correction therein that the same may conform to the record of the case in the Patent Office.

Signed and sealed this 8th day of March, A. D., 1910.

[SEAL.]

C. C. BILLINGS,
*Acting Commissioner of Patents.*